United States Patent [19]

Thompson et al.

[11] Patent Number: 4,657,359

[45] Date of Patent: Apr. 14, 1987

[54] TRANSPIRATIONALLY COOLED LASER MIRROR

[75] Inventors: Charles C. Thompson, Jupiter; James R. Bolch, North Palm Beach, both of Fla.

[73] Assignee: United Technologies Corporation, Hartford, Conn.

[21] Appl. No.: 854,634

[22] Filed: Apr. 22, 1986

[51] Int. Cl.$^4$ ............................ G02B 5/08; G02B 7/18
[52] U.S. Cl. .................................................... 350/610
[58] Field of Search ............... 350/610, 609, 607, 588; 219/121 FS

[56] References Cited

U.S. PATENT DOCUMENTS 4,606,620  8/1986  Nagano ............................... 350/610

Primary Examiner—Jon W. Henry
Attorney, Agent, or Firm—J. Kevin Grogan

[57] ABSTRACT

A novel cooled mirror for use with high energy lasers includes an optical coating for reflection a laser signal. A heat exchanger having internal passages with flowing coolant is adjacent to the optical coating and removes the heat therefrom. The heat exchanger is affixed to a substrate having supply and return ports for the coolant. The substrate is constructed of porous material so a fraction of the supply coolant bleeds through the substrate to the return coolant. The transpiration flow produces thermal isolation and maximizes the utilization of available coolant heat capacity.

4 Claims, 2 Drawing Figures

TRANSPIRATIONALLY COOLED LASER MIRROR

TECHNICAL FIELD

This invention relates to cooled mirrors used with high energy lasers and more particularly to laser mirrors employing transpiration cooling.

BACKGROUND ART

Cooled mirrors are well known in the art. These mirrors are used in conjunction with laser beams having extremely high energies such as those used in industrial laser welding and the Strategic Defense Initiative. In operation, these mirrors experience tremendous thermal loading which, if uncooled, would cause unacceptable amounts of mirror distortion. Typically, prior art cooled mirrors comprise a substrate and optically reflective surface with a heat exchanger positioned therebetween. Heat deposited by the incident laser beam is transported away from the reflective surface by a liquid coolant flowing through the heat exchanger, exiting the mirror by way of the substrate.

For high performance applications the substrate must provide a stable reference for the optical surface and provide attachment points for mounting. The substrate structure must also incorporate high stiffness construction to resist deformations caused by thermal growth of the heat exchanger. Coolant must be supplied to the heat exchanger at many locations, mandating extensive manifolding within the substrate. This configuration produces an unacceptable amount of heating of the substrate due to heat transfer between warmed coolant returning from the the heat exchanger and the substrate. The substrate is relatively massive and its temperature responds slowly to heat input. Slow thermal responsivity produces mirror distortions that do not stabilize during operation.

Prior art laser mirror designs have employed several techniques to shield the substrate from heated coolant returning from the heat exchanger. Typical of these are insulated inserts positioned in the coolant return ports. Mirror substrates constructed in this fashion are complex, requiring many separate components and assembly steps.

DISCLOSURE OF INVENTION

An object of the present invention is to provide a mirror having transporation cooling for receiving high power laser signals.

According to the present invention, a transpirationally cooled laser mirror includes an optical coating which reflects an optical signal at a first surface. The heat generated therefrom is conducted to an opposing second surface. A heat exchanger is affixed to the coating second surface and conducts the heat to coolant flowing in internal passages fed by manifolds. The manifolds further have source and return openings. A substrate is affixed to the heat exchanger so that source and return ports in the substrate will be in register with corresponding manifold source and return openings in the heat exchanger. The substrate is further comprised of a porous material additionally enabling the coolant to transpirationally flow between the substrate source and return ports.

BEST MODE FOR CARRYING OUT THE INVENTION

Figure 1:
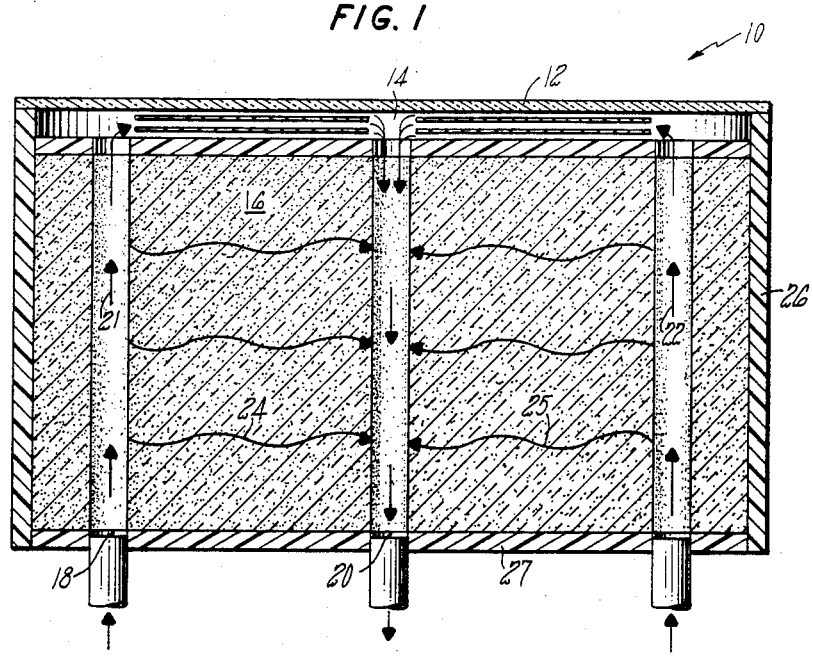
FIG. 1 is a sectioned illustration of a transpirationally cooled mirror provided according to the present invention.

FIG. 1 is a sectioned illustration of a transpirationally cooled mirror 10 provided according to the present invention. The mirror includes optical coating 12 which is of a conventional high reflectivity type used with high power applications. In the best mode embodiment the optical coating used with carbon dioxide and chemical lasers can be either metallized (silver) with a conventional protective overcoat (aluminum oxide) or can be comprised of a multilayer stack of quarter wave dielectrics.

The mirror also includes heat exchanger 14 receiving the optical coating which is of a conventional design comprised of several closely spaced plates with internal passages of either channel or interrupted flow type. Internal manifolds allow the heat exchanger plates to be configured in series or parallel as determined by total flow and supply pressure constraints. The heat exchanger is mounted to substrate 16 such that coolant supply and return ports, such as ports 18 and 20 are in registration with corresponding openings in the heat exchanger manifolds. The substrate is characterized by a porous internal structure.

The coolant (not shown) is conventional and includes water or liquid ammonia. The coolant flows up to and through the heat exchanger (flow lines 21 and 22). By transpiration a portion of the coolant also flows through the porous substrate to the coolant return port (flow lines 24 and 25). Transpiration cooling provides effective thermal isolation between warmed coolant returning from the heat exchanger and the substrate without the need for mechanical inserts.

The substrate itself is formed from a single piece of porous material. In the best mode embodiment the substrate comprises silicon carbide, such as available through SOHIO Chemicals and Industrial Products Company. The material should ideally have an isotropic internal pore structure, although materials with other pore structures may be substituted. In the best mode embodiment the porous SiC substrate is transpirationally cooled by approximately 20% of the total mirror flowrate. Alternative porous materials which can be equivalently substituted for silicon carbide include molybdenum and aluminum.

Also shown in FIG. 1 is closure ring 26 and closure plate 27. These elements confine the coolant and interface the mirror with any surrounding structures as needed. For example, the closure plate acts as an end plate in the cooled mirror of FIG. 1. Both the closure ring and plate are of a conventional design typically selected to be a nonporous version of the substrate material. In the best mode embodiment both the the closure ring and plate comprise nonporous silicon carbide. Those skilled in the art will also note that the heat exchanger may also be comprised of a nonporous version of the substrate material selected and a thin cladding applied to its surface to enhance its polishability properties. In the best mode embodiment the mirror is assembled using conventional techniques, including transient liquid phase (TLP ®) bonding methods.

Coolant supply and return ports can be located as appropriate in dependence on the heat exchanger employed. The amount of transpiration flow between the supply and return ports is controlled by pore spacing, the porosity of the substrate material and the coolant pressure difference between supply and return ports.

The substrate included with the transpiration cooled mirror of FIG. 1 is very efficient at providing thermal insulation because the direction of coolant flow is opposite to that of heat flow. Therefore, a mirror provided according to the present invention maximizes the utilization of available coolant heat capacity. The large internal surface area of the porous substrate produces high heat transfer even when coolant flow is laminar. Consequently, the temperatures of the coolant and substrate are virtually identical. As is well known, heat transfer between returning coolant and the surrounding substrate is a function of coolant boundary layer thickness. With a transpirationally cooled mirror provided according to the present invention, fluid mass injection through the walls of the substrate return ports increases the thickness of the coolant boundary layer in the return ports, thereby lowering substrate wall temperatures.

Figure 2:
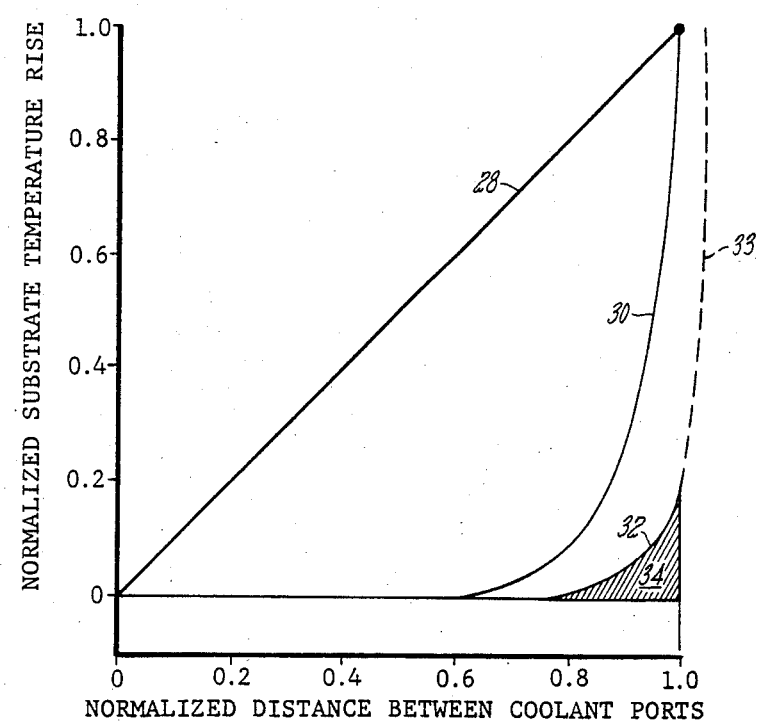
FIG. 2 is a diagram illustrating substrate temperature rise as a function of coolant port separation for the transpirationally cooled mirror of FIG. 1.

FIG. 2 is a diagram illustrating the substrate temperature rise as a function of coolant port separation. Curve 28 indicates the temperature profile for a solid substrate used as a reference. Curve 30 shows the temperature profile of a porous substrate without any coolant injection through the walls of the return ports. It can be seen that the end point temperature is the same as that for the solid substrate, but with a substantially altered temperature distribution. Curve 32 corresponds to a substrate included with a transpirationally cooled mirror provided according to the present invention. With coolant injection the beneficial effects of transporation cooling can be seen, as the temperature rise of the substrate is markedly reduced. Curve 33 illustrates the temperature rise in the boundary layer of the return coolant flow which does not contribute to substrate heating.

Those skilled in the art will note that total substrate distortion is proportional to the product of substrate temperature rise and heated substrate volume. As indicated by shaded region 34, the amount of substrate material that is actually heated is very small in a cooled mirror provided according to the present invention. The potential for substrate thermal distortion (curve 32) is approximately 3.2% of that of a solid substrate (curve 28). Moreover, the time needed to reach thermal equilibrium is very short. Long term transient thermal distortions caused by thermally expanding substrates is essentially eliminated. The preconditioning time of the mirror can also be substantially reduced. In addition, cooled mirrors having lighter weight can be produced because of the porosity of the substrate.

Similarly, although the invention has been shown and described with respect to a best mode embodiment thereof, it should be understood by those skilled in the art that various other changes, omissions and additions thereto may be made therein without departing from the spirit and scope of the invention.

What is claimed is:

1. A transpirationally cooled laser mirror comprising:
   optical coating means reflecting an optical signal at a first surface generating heat therein, said optical coating means having a thermally conductive opposing second surface providing said heat therethrough;
   heat exchanger means receiving said optical coating means second surface at a first surface thereof conducting said heat to coolant means flowing in passages fed by manifolds within said heat exchanger, said manifolds further having source and return openings;
   substrate means adapted to receive said heat exchanger means in register with substrate source and return ports corresponding to said manifold source and return openings, said substrate means comprised of porous material additionally enabling said coolant to transpirationally flow between said substrate source and return ports.

2. The transpirationally cooled laser mirror of claim 1 wherein said porous material comprises silicon carbide.

3. The transpirationally cooled laser mirror of claim 1 wherein said porous material comprises molybdenum.

4. The transpirationally cooled laser mirror of claim 1 wherein said porous material has substantially isotropic pore structure.

* * * * *